(12) United States Patent
Dooley

(10) Patent No.: US 7,768,767 B2
(45) Date of Patent: Aug. 3, 2010

(54) TRIGGERED PULSED IGNITION SYSTEM AND METHOD

(75) Inventor: Kevin Allan Dooley, Mississauga (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 279 days.

(21) Appl. No.: 11/381,789

(22) Filed: May 5, 2006

(65) Prior Publication Data

US 2007/0256426 A1    Nov. 8, 2007

(51) Int. Cl.
*F23Q 3/00* (2006.01)
(52) U.S. Cl. .................. 361/253; 361/257
(58) Field of Classification Search .......... 361/253
See application file for complete search history.

(56) References Cited

U.S. PATENT DOCUMENTS

| | | | | |
|---|---|---|---|---|
| 3,450,942 | A | * | 6/1969 | Linkroum et al. ..... 315/209 CD |
| 4,514,712 | A | * | 4/1985 | McDougal ................ 336/96 |
| 4,589,398 | A | * | 5/1986 | Pate et al. ................ 123/596 |
| 4,658,185 | A | * | 4/1987 | Albrecht et al. ........... 315/58 |
| 4,681,529 | A | | 7/1987 | Home |
| 4,839,772 | A | * | 6/1989 | Choi et al. ................ 361/256 |
| 5,053,913 | A | | 10/1991 | Lozito et al. |
| 5,347,422 | A | | 9/1994 | Smith et al. |
| 5,399,942 | A | | 3/1995 | Frus |
| 5,561,350 | A | | 10/1996 | Frus et al. |
| 5,654,868 | A | | 8/1997 | Buer |
| 5,754,011 | A | | 5/1998 | Frus et al. |
| 5,852,381 | A | | 12/1998 | Wilmot et al. |
| 5,862,033 | A | | 1/1999 | Geislinger et al. |
| 6,155,212 | A | | 12/2000 | McAlister |
| 6,191,536 | B1 | | 2/2001 | Dolmovich |
| 6,353,293 | B1 | | 3/2002 | Frus et al. |
| 6,484,707 | B1 | | 11/2002 | Frus et al. |
| 6,662,793 | B1 | | 12/2003 | Allen et al. |
| 6,917,501 | B2 | | 7/2005 | Byrne et al. |
| 2005/0144959 | A1 | | 7/2005 | Lu et al. |

FOREIGN PATENT DOCUMENTS

GB    1 593 325    7/1981

* cited by examiner

*Primary Examiner*—Fritz Fleming
*Assistant Examiner*—Lucy Thomas
(74) *Attorney, Agent, or Firm*—Ogilvy Renault LLP

(57) ABSTRACT

The ignition system is for use in a gas turbine engine. It comprises an ignition plug having a triggered spark gap therein.

9 Claims, 3 Drawing Sheets

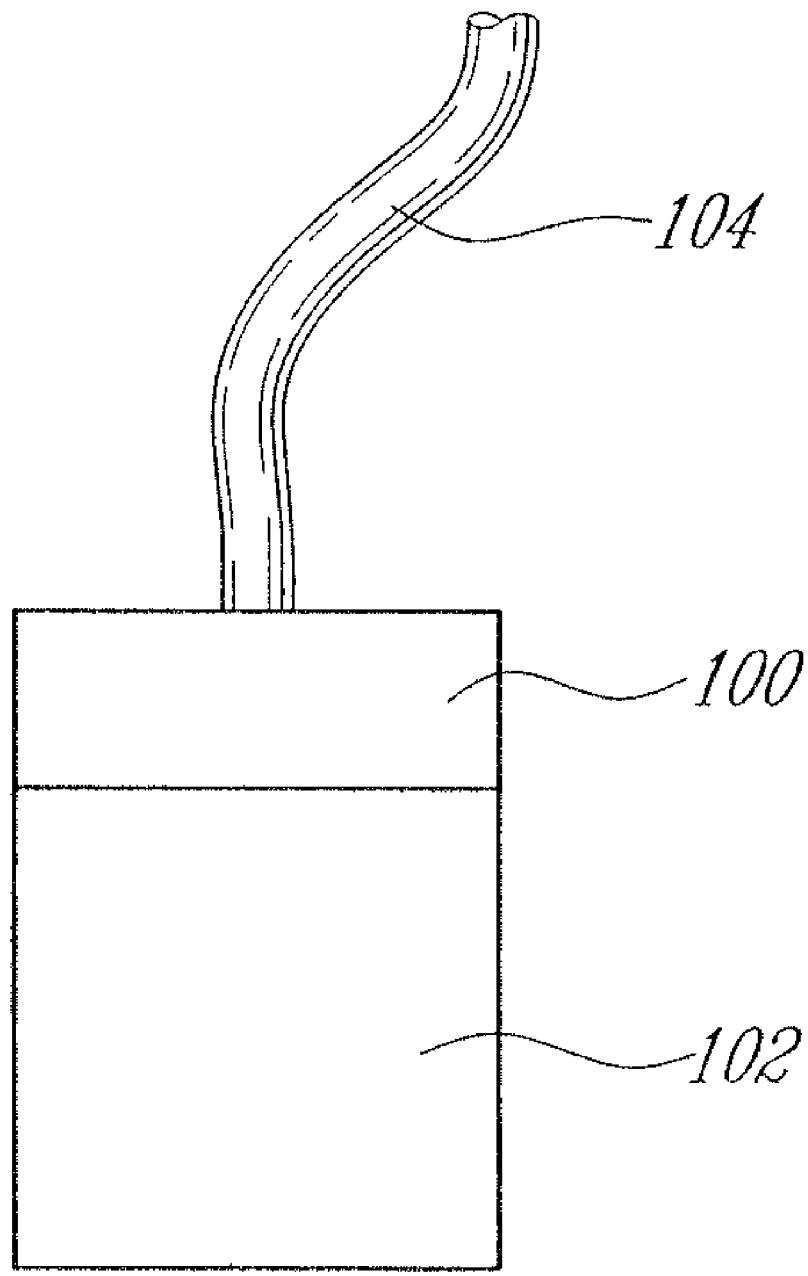
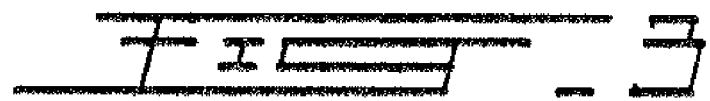

TRIGGERED PULSED IGNITION SYSTEM AND METHOD

TECHNICAL FIELD

The invention relates generally to a system and a method for generating ignition sparks, including an ignition plug and an ignition system for use in a gas turbine engine.

BACKGROUND OF THE ART

There are many machines and environments requiring the use of electrically-generated sparks, including gas turbine engines, to trigger the combustion of a fuel and air mixture. These sparks are generated by the sudden discharge of electricity between two electrodes at a voltage that is typically of several thousand volts. The space between the two electrodes is usually referred to as the ignition spark gap. The electricity is initially provided to a discharge capacitor. Once the capacitor is charged, the current is very rapidly discharged through the ignition spark gap, thereby forming a sudden electrical arc which is referred to as the "spark". This operation is repeated for as long as the presence of sparks is necessary.

Recent systems include high voltage solid state switching devices. However, the solid state switching devices tend to be very expensive and their reliability is generally not as good as required.

Accordingly, there is a need to provide an improved system and method for generating ignition sparks.

SUMMARY OF THE INVENTION

In one aspect, the present invention provides an ignition system for a gas turbine engine, the system comprising: an ignition plug having a first and a second electrode adjacent to each other and defining an ignition spark gap, and a triggered spark gap having a power inlet terminal, a power outlet terminal and a trigger terminal, the power outlet terminal being electrically connected to the first electrode; a discharge capacitor having opposite terminals, one terminal being electrically connected to the power inlet terminal of the trigger spark gap and the other terminal being electrically connected to the second electrode; and a trigger device electrically connected to the trigger terminal of the trigger spark gap.

In another aspect, the present invention provides an ignition plug for an ignition system for a gas turbine engine, the ignition plug comprising: an insulator; a pair of adjacent spark-generating electrodes located at one end of the insulator; a main electrical circuit inside the insulator and connected in series with the electrodes; a triggered spark gap mounted in series on the main electrical circuit, the trigger spark gap having a trigger terminal; and a trigger electrical circuit having one end connected to the trigger terminal of the trigger spark gap.

In another aspect, the present invention provides a method of generating an ignition spark in a gas turbine engine, the method comprising: charging up a discharge capacitor; and generating a trigger pulse signal indicative that the capacitor is to be discharged; sending the trigger pulse signal to a trigger spark gap provided in an ignition plug to discharge the capacitor and generate a current; and passing the current between external electrodes provided on the ignition plug to generate a spark.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 3 is a schematic view of an alternative embodiment.

DETAILED DESCRIPTION

Figure 1:
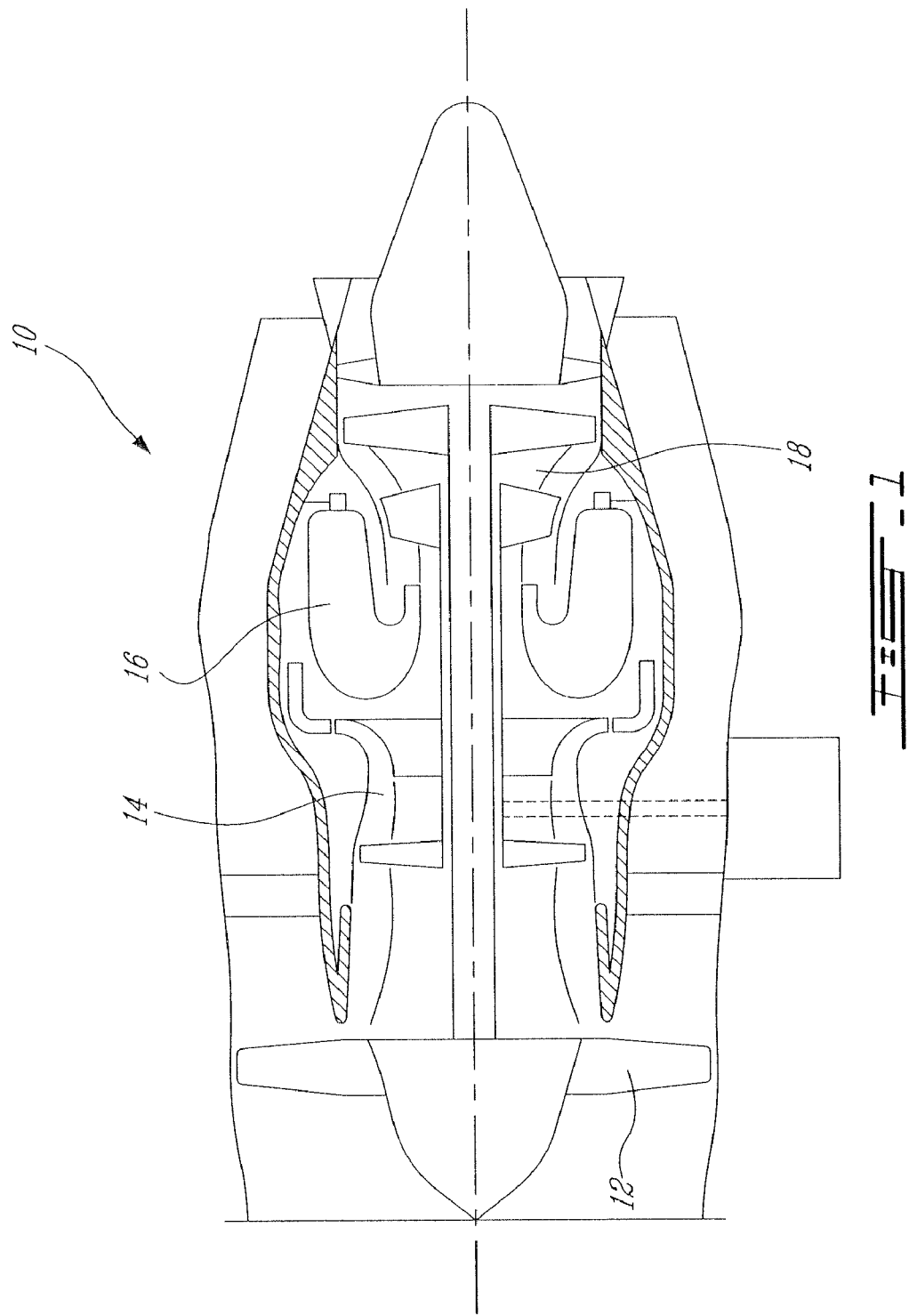
FIG. 1 is a schematic view of a gas turbine engine showing an example of a possible environment in which the system and method can be used.

FIG. 1 illustrates an example of a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The gas turbine engine 10 is an example of a machine in which a triggered pulse ignition system and the method can be used.

Figure 2:
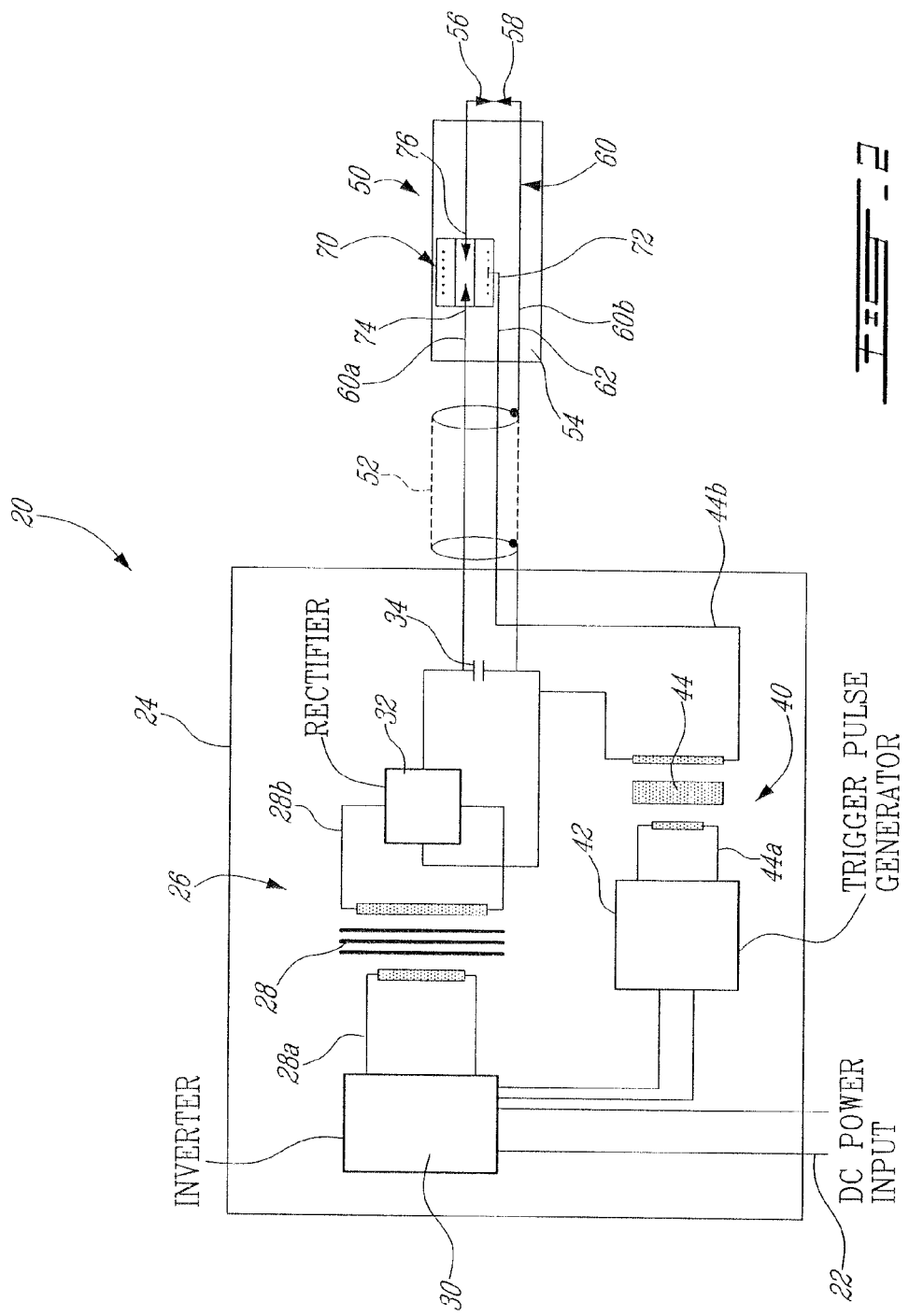
FIG. 2 is a schematic view of an example of a system in accordance with a possible embodiment.

FIG. 2 illustrates an example of a trigger pulse ignition system 20 in accordance with a possible embodiment. This illustrated system 20 is supplied by a DC power input 22 connected to a corresponding power source. The power input 22 is fed into what is referred to as the igniter exciter box 24. The box 24 includes a charging unit 26, which unit 26 includes a step-up transformer 28. The primary winding 28a of the step-up transformer 28 is connected to an inverter 30. The inverter transforms the DC power from the DC input 22 into AC power. The step-up transformer 28 increases the voltage from the primary winding 28a to the required voltage in the secondary winding 28b, which voltage is typically of several thousand volts. The illustrated charging unit 26 further comprises a rectifier 32 connected to the secondary winding 28b of the step-up transformer 28. The rectifier 32 transforms the AC current into a DC current. The terminals at the output of the rectifier 32 are connected to corresponding terminals of a discharge capacitor 34 in which the electrical energy is stored and then retrieved during each cycle.

The igniter exciter box 24 also comprises a trigger pulse unit 40. This unit 40 includes a trigger pulse generator 42 that, in this case, is connected to the inverter 30. The trigger pulse generator 42 is connected to the primary winding 44a of a second step-up transformer 44.

The illustrated system 20 further comprises an ignition plug 50 remotely located from the igniter exciter box 24. The ignition plug 50 will be used next to an area where the fuel and air mixture is burned, thus at a location where intense heat is generated. The igniter exciter box 24 is thus preferably away from this area and kept at a relatively cooler temperature. Both are connected together using a three-conductor external high voltage cable 52, as schematically illustrated.

The ignition plug 50 comprises a body including an insulator 54 and at the end of which a pair of adjacent spark-generating electrodes 56, 58 are located. A main electrical circuit 60 is provided inside the insulator 54. The main electrical circuit 60 has two portions 60a, 60b. The first portion 60a has one end electrically connected to the first electrode 56. The second end of the first portion 60a is connected to the cable 52. The second portion 60b of the main electrical circuit 60 has a first end connected to the second electrode 58 and a second end connected to the cable 52. As shown in FIG. 2, a trigger spark gap 70 is preferably mounted in series inside the ignition plug 50. This way, it is automatically replaced whenever the ignition plug 50 is replaced. It thus has a lifespan that is equal or greater than that of the other parts of the ignition plug 50. A removable connection is provided between the cable 52 and the main electrical circuit 60 of the ignition plug 50 to facilitate the maintenance.

The triggered spark gap 70 includes a pair of opposite internal electrodes located within a container containing a non-radioactive gas that can be ionized. A third internal electrode is adjacent to one of the internal electrodes (trigger electrode). This third internal electrode is connected to an outside terminal 72 referred to as the trigger terminal. One side of the trigger spark gap 70 is a power inlet terminal 74 to which one of the terminals of the discharge capacitor 34 is electrically connected, and the opposite side is a power outlet terminal 76 that is electrically connected to the first ignition spark gap electrode 56.

In use, in each cycle, the charging unit 26 charges the discharge capacitor 34 up to its optimal value. The system 20 is designed so that once this optimal value is reached, the trigger pulse unit 40 generates a high voltage trigger pulse signal that is sent to the third electrode of the trigger spark gap 70. The trigger pulse signal is generated by the trigger pulse generator 42 and the second step-up transformer 44. The secondary winding 44b of the transformer 44 has one side connected to the trigger terminal 72 via the cable 52 and a trigger electrical circuit 62 inside the insulator 54. The other side is connected to the terminal of the discharge capacitor 34 that is opposite the one to which the power inlet terminal 74 of the trigger spark gap 70 is connected. An alternate arrangement that may be used has the secondary winding 44b of the second step-up transformer 44 connected between the power inlet terminal 74 and the trigger electrode of the triggered spark gap 70. The trigger pulse signal, when sent to the trigger spark gap 70, loops back to the transformer 44 through the main electrical circuit 60 or alternatively through the first portion 60a.

Before the discharge, the two opposite internal electrodes of the triggered spark gap 70 have a relatively high potential between them. The trigger pulse in the third electrode ionizes the gas between the internal electrodes, thereby closing the circuit between the corresponding terminal of the discharge capacitor 34 and the first electrode 56 of the ignition spark gap. The ignition spark gap is designed so that at that instant, the current is allowed to pass between both of its electrodes 56, 58, thereby creating an arc that is referred to as a "spark". This high intensity spark can be used to ignite the fuel and air mixture inside the combustor 16 of the gas turbine engine 10.

Since in conventional configurations of discharge type ignition systems, the voltage transient used to generate the ignition spark is itself transmitted along the cable between the ignition box 24 and the ignition plug 50, the voltage rate of rise at the igniter electrodes is significantly slower than in the present invention, as a result of the characteristic impedance of the cable in the former. In the invention, the voltage rate of rise is very rapid, since there is no voltage transient along the cable to the igniter gap. The voltage in the cable connected to the igniter gap is essentially a DC voltage, which is not necessarily changing as a function of time, when the trigger pulse is applied to cause gap ionization. This results in an extremely rapid rate of voltage rise at the actual ignition spark gap (when the trigger spark gap is ionized). It is known that the faster the voltage rise occurs across a spark gap, the better the ionization of the gap, for a given spark gap distance. This leads to a longer lasting spark gap in service, since the normal ware of the spark gap of an ignition plug results in the spark gap distance (between electrodes) increasing until eventually the voltage required to ionize the gap exceeds the available voltage from the ignition unit. In the invention this wear can be more than in existing system while still providing useful ignition sparks.

It should be noted that the triggered spark gap may be an add-on or adaptor unit 100 that is used with a conventional igniter 102 as an improvement, as shown in FIG. 3. This can extend the life of the conventional igniter 102. The triggered spark gap, for example, could be housed inside the adaptor unit 100 which connects the conventional igniter 102 to the cable 104.

The above description is meant to be exemplary only, and one skilled in the art will recognize that changes may be made to the embodiments described without department from the scope of the invention disclosed. For example, the charging unit 26 can be omitted if there is an outside high voltage source capable of directly charging the capacitor 34. Still other modifications which fall within the scope of the present invention will be apparent to those skilled in the art, in light of a review of this disclosure, and such modifications are intended to fall within the appended claims.

The invention claimed is:

1. An ignition system for a gas turbine engine, the system comprising:
   an ignition plug having a first and a second electrode adjacent to each other and defining an ignition spark gap, and a triggered spark gap inside the ignition plug, the triggered spark gap having a power inlet terminal, a power outlet terminal and a trigger terminal, the power outlet terminal being electrically connected to the first: electrode;
   a discharge capacitor for discharging current into the ignition spark gap, the discharge capacitor having opposite terminals, one terminal being electrically connected to the power inlet terminal of the trigger spark gap and the other terminal being electrically connected to the second electrode, the discharge capacitor being located external to the ignition plug; and
   a trigger device electrically connected to the trigger terminal of the trigger spark gap.

2. The ignition system as defined in claim 1, wherein the ignition plug is remotely located with reference to the trigger device, the ignition plug being electrically connected to the discharge capacitor and the trigger device through an external cable.

3. The ignition system as defined in claim 1, wherein the cable is removably connected to the ignition plug.

4. The ignition system as defined in claim 1, wherein the discharge capacitor is electrically connected to a rectifier, itself connected to a secondary winding of a step-up transformer.

5. The ignition system as defined in claim 4, wherein the step-up transformer has a primary winding that is electrically connected to an inverter receiving electrical power from a DC power input.

6. The ignition system as defined in claim 1, wherein the trigger device includes a step-up transformer electrically connected to a trigger pulse generator.

7. An ignition plug for an ignition system for a gas turbine engine, the ignition plug comprising:
   an insulator;
   a pair of adjacent spark-generating electrodes located at one end of the insulator;
   a main electrical circuit inside the insulator and connected in series with the electrodes;

a triggered spark gap mounted in series on the main electrical circuit, the trigger spark gap having a trigger terminal; and a trigger electrical circuit having one end connected to the trigger terminal of the trigger spark gap;

wherein the ignition plug does not include a capacitor for discharging current between the spark-generating electrodes.

8. The ignition plug as defined in claim 7, wherein the main electrical circuit has two ends, each end defining an external terminal on the insulator, the trigger electrical circuit comprising another end, opposite the end connected to the trigger terminal, the other end of the trigger electrical circuit defining a third external terminal on the insulator.

9. A method of generating an ignition spark in a gas turbine engine, the method comprising:

charging up a discharge capacitor;

generating a trigger pulse signal indicative that the capacitor is to be discharged;

sending the trigger pulse signal to a trigger spark gap provided in an ignition plug to discharge the capacitor and generate a current, the discharge capacitor being disposed external to the ignition plug; and passing the current between external electrodes provided on the ignition plug to generate a spark.

* * * * *